United States Patent
Takeuchi et al.

(10) Patent No.: US 11,939,015 B2
(45) Date of Patent: Mar. 26, 2024

(54) VEHICLE CONTROL DEVICE AND VEHICLE CONTROL METHOD

(71) Applicant: Mitsubishi Electric Corporation, Tokyo (JP)

(72) Inventors: Yu Takeuchi, Tokyo (JP); Shuuhei Nakatsuji, Tokyo (JP); Fumiaki Kadoya, Tokyo (JP); Kazuo Hitosugi, Tokyo (JP); Yuki Yoshida, Tokyo (JP); Kazushi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 17/298,256

(22) PCT Filed: Mar. 25, 2019

(86) PCT No.: PCT/JP2019/012340
§ 371 (c)(1),
(2) Date: May 28, 2021

(87) PCT Pub. No.: WO2020/161928
PCT Pub. Date: Aug. 13, 2020

(65) Prior Publication Data
US 2022/0111891 A1 Apr. 14, 2022

(30) Foreign Application Priority Data
Feb. 6, 2019 (JP) .................................. 2019-019315

(51) Int. Cl.
*B62D 6/08* (2006.01)
*B62D 15/02* (2006.01)

(52) U.S. Cl.
CPC ............. *B62D 6/08* (2013.01); *B62D 15/025* (2013.01)

(58) Field of Classification Search
CPC ........ B62D 6/08; B62D 15/025; B62D 1/286; B62D 6/002; B60W 2540/18; B60W 2710/207; B60W 30/12
USPC .......................................................... 701/41
See application file for complete search history.

(56) References Cited

U.S. PATENT DOCUMENTS

2018/0141588 A1* 5/2018 Shimizu ............. B62D 15/0265

FOREIGN PATENT DOCUMENTS

WO 2017/022474 A1 2/2017

OTHER PUBLICATIONS

International Search Report for PCT/JP2019/012340, dated May 7, 2019.

* cited by examiner

*Primary Examiner* — Scott A Reinbold
(74) *Attorney, Agent, or Firm* — Sughrue Mion, PLLC; Richard C. Turner

(57) ABSTRACT

By an offset amount being calculated based on a lateral position deviation from a target travel path at a forward point-of-gaze of a host vehicle at a time of a driver steering state, a series of vehicle control operations until switching back from the driver steering state to an automatic steering control, and traveling along an offset travel path, becomes smoother, whereby comfort when riding in a vehicle is increased.

20 Claims, 16 Drawing Sheets

VEHICLE CONTROL DEVICE AND VEHICLE CONTROL METHOD

CROSS REFERENCE TO RELATED APPLICATIONS

This application is a National Stage of International Application No. PCT/JP2019/012340 filed Mar. 25, 2019, claiming priority based on Japanese Patent Application No. 2019-019315 filed Feb. 6, 2019.

TECHNICAL FIELD

The present application relates to a vehicle control device and a vehicle control method.

BACKGROUND ART

There is an existing vehicle control device that maintains travel of a host vehicle inside a traffic lane, with a center of the traffic lane as a target travel path. The existing vehicle control device is such that there are cases in which a driver wishes to cause the host vehicle to travel in a position (an offset position) on either the left or the right of the traffic lane center in accordance with a travel status of the host vehicle. However, when the driver carries out a steering intervention during driver assistance, there is a problem in that steering torque is generated in a direction opposite to that intended by the driver, causing a steering burden on the driver to increase instead.

Because of this, a vehicle control device disclosed in, for example, Patent Literature 1 is such that when a condition relating to a state of a host vehicle or a state of a driver is satisfied after a steering intervention by the driver, an amount of offset from a traffic lane center in the same traffic lane is stored, and the host vehicle is caused to travel along a path shifted in a lateral direction with respect to the host vehicle, thereby forming a countermeasure to the heretofore described problem.

CITATION LIST

Patent Literature

Patent Literature 1: WO 2017/022474

SUMMARY OF INVENTION

Technical Problem

The existing vehicle control device is such that the amount of lateral offset with respect to the center of the traffic lane is a lateral position deviation from the center of the traffic lane to a central position of the host vehicle. This means that when there is an angle error between an original path and the host vehicle, an operation of the host vehicle becomes unstable. In order to avoid this operational instability of the host vehicle, a condition for causing the offset amount to be reflected is set, but there is a problem in that a driving operation such that causes the condition to be fulfilled is needed, and functional convenience is lost.

Also, there is a need for the condition to be fulfilled for a certain time from the driver implementing a steering intervention to the offset amount being reflected in a driver assistance device, because of which there is a problem in that there remains a section wherein torque for driver assistance is generated in a direction opposite to that of the steering torque.

The present application discloses technology for resolving the heretofore described kinds of problem, and has an object of providing a vehicle control device and a vehicle control method such that comfort when riding in a vehicle is increased.

Solution to Problem

A vehicle control device disclosed in the present application is characterized by including a road information input circuitry that detects relative positions of a host vehicle and a road, a target travel path calculating circuitry that calculates a target travel path for causing the host vehicle to travel along the road, a driver intervention detecting circuitry that detects a driver steering intervention at a time of an automatic steering state of following the target travel path, a corrected target travel path calculating circuitry that, when the driver intervention detecting circuitry detect a driver steering intervention, calculates an offset amount with respect to the target travel path, and calculates a corrected target travel path in which the offset amount is reflected with respect to the target travel path, and a target steering angle calculating circuitry that, after the driver steering intervention is finished, calculates a target steering angle for following the corrected target travel path based on a state of the host vehicle, wherein the corrected target travel path calculating circuitry calculates the offset amount based on a lateral position deviation from the target travel path at a forward point-of-gaze of the host vehicle obtained while the driver steering intervention is continuing.

The vehicle control device disclosed in the present application is such that, according to the configuration, a lateral position deviation with respect to a target travel path at a forward point-of-gaze of a host vehicle obtained while a driver steering intervention is continuing is used as an offset amount, because of which the offset amount can be calculated even in a state wherein an angle deviation remains, and a smoother state transition can be carried out.

DESCRIPTION OF EMBODIMENTS

Hereafter, preferred embodiments of a vehicle control device and a vehicle control method according to the present application will be described, using the drawings.

First Embodiment

Figure 1:
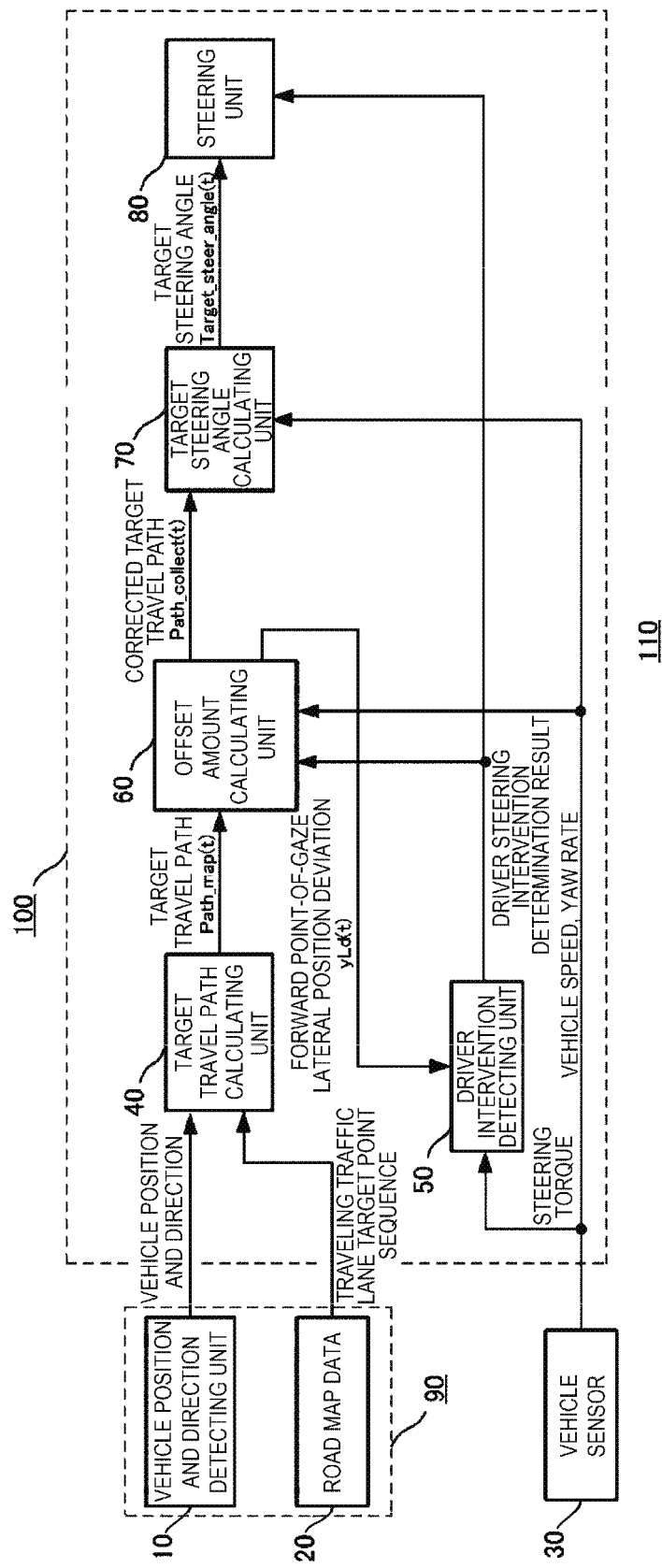
FIG. 1 is a block diagram showing a configuration of a vehicle control device according to a first embodiment.

FIG. 1 is a block diagram showing a configuration of a vehicle control device according to a first embodiment.

In FIG. 1, a vehicle control device 110 includes a vehicle position and direction detecting unit 10, road map data 20, a vehicle sensor 30, a target travel path calculating unit 40, a driver intervention detecting unit 50, an offset amount calculating unit 60, which is a corrected target travel path calculating unit, a target steering angle calculating unit 70, and a steering unit 80. A road information input unit 90 is configured of the vehicle position and direction detecting unit 10 and the road map data 20, and the road information input unit 90 detects relative positions of a host vehicle and a road. Also, a computation control unit 100 is configured of the target travel path calculating unit 40, the driver intervention detecting unit 50, the offset amount calculating unit 60, the target steering angle calculating unit 70, and the steering unit 80.

The vehicle position and direction detecting unit 10 detects a coordinate position and a direction of a host vehicle by utilizing position fixing information from a man-made satellite. At least a target point sequence of a traffic lane center is included in the road map data 20. Also, a steering torque sensor, a vehicle speed sensor, and a yaw rate sensor are included in the vehicle sensor 30. The target travel path calculating unit 40 calculates a target travel path Path_map (t) of the host vehicle based on information from the vehicle position and direction detecting unit 10 and the road map data 20. The target travel path calculating unit 40, for example, calculates an approximated curve based on a target point sequence on a map in a host vehicle reference coordinate system, and outputs a coefficient of each of a lateral position deviation with respect to the approximated curve, an angle deviation, a road curvature, and a curvature change amount as a calculation result.

The driver intervention detecting unit 50 determines whether a preference of a driver is requesting an automatic driving state or requesting a driver steering state. For example, when using a value of a steering torque sensor installed in a vehicle, the driver intervention detecting unit 50 can detect a torque applied to a steering wheel by the driver guiding the steering wheel, because of which the driver intervention detecting unit 50 can detect whether or not the driver wishes to continue an automatic driving state. Also, when using a lateral position deviation yld(t) from the target travel path Path_map (t) at a host vehicle forward point-of-gaze calculated by the offset amount calculating unit 60, to be described hereafter, the driver intervention detecting unit 50 can identify an action by the driver of moving outside the traffic lane using the lateral position deviation yld(t).

The offset amount calculating unit 60 calculates an offset amount with respect to the target travel path Path_map (t) at a time of driver steering intervention based on information from the target travel path calculating unit 40, the driver intervention detecting unit 50, and the vehicle sensor 30, and outputs information relating to a corrected target travel path Path_collect (t) that takes the calculated offset amount into consideration. Also, the offset amount calculating unit 60 outputs the lateral position deviation yld(t) from the target travel path Path_map (t) at the host vehicle forward point-of-gaze to the driver intervention detecting unit 50.

The target steering angle calculating unit 70 calculates a target steering angle Target_steer_angle (t) for the host vehicle to follow a travel path based on information from the offset amount calculating unit 60 and the vehicle sensor 30. Also, the steering unit 80 carries out a steering control based on information from the target steering angle calculating unit 70 and the driver intervention detecting unit 50.

The vehicle control device 110 according to the first embodiment is configured as heretofore described, and when a driver steering intervention is detected by the driver intervention detecting unit 50, steering assistance control that assists driver steering is executed, a driver steering amount decreases, there is a shift to an automatic driving state when a state of non-intervention is identified by the driver intervention detecting unit 50, and a steering angle tracking control such that an actual steering angle tracks the target steering angle Target_steer_angle (t) output by the target steering angle calculating unit 70 is implemented.

Figure 2:
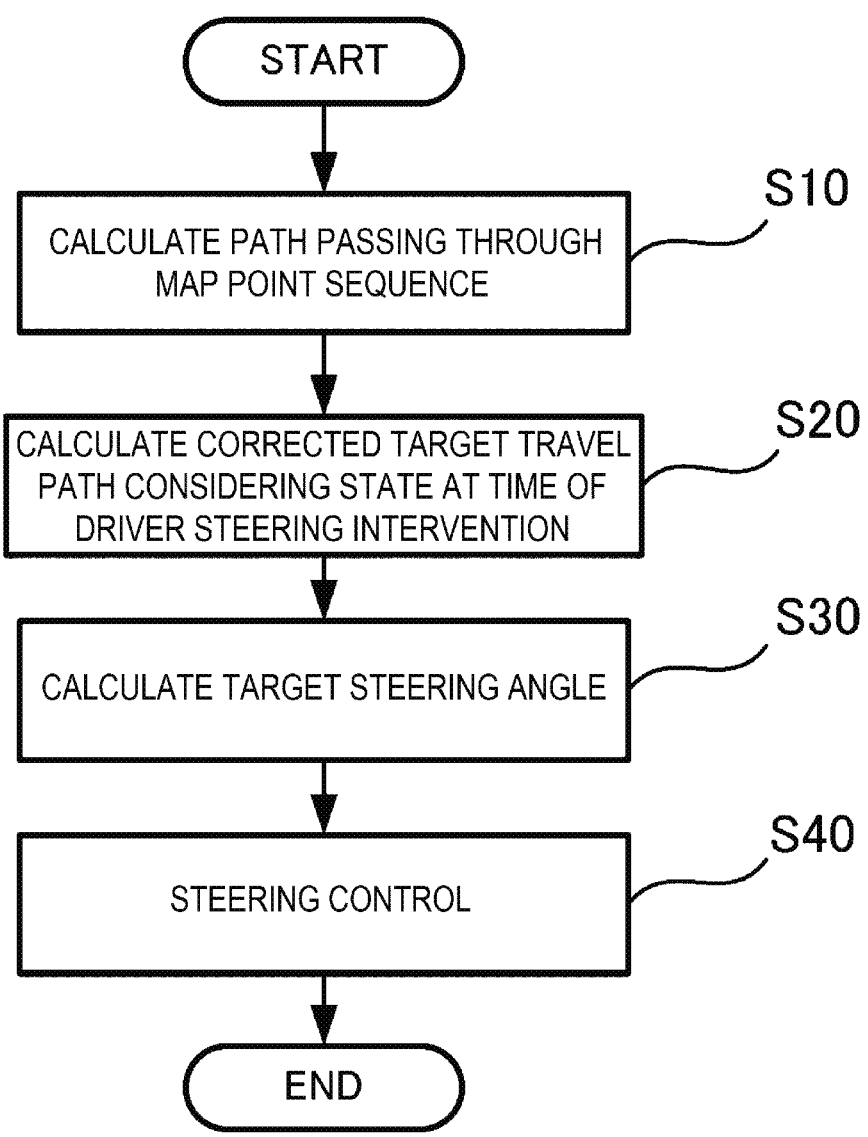
FIG. 2 is a flowchart showing a vehicle control method according to the first embodiment.

Next, an overall operation of the vehicle control device 110 will be described, using a flowchart of FIG. 2. The operation shown in the flowchart of FIG. 2 is an operation that is executed repeatedly while a vehicle is traveling.

Firstly, the kind of target travel path Path_map (t) that passes through a target point sequence (basically disposed in the center of each traffic lane) of the traffic lane in which the host vehicle is currently traveling is calculated by the target travel path calculating unit 40 as an approximate expression in the host vehicle reference coordinate system (step S10).

Next, the corrected target travel path Path_collect (t), which includes information relating to a time of driver steering intervention, is calculated by the offset amount calculating unit 60 (step S20).

Next, the target steering angle Target_steer_angle (t) such that the host vehicle follows the corrected target travel path Path_collect (t) is calculated by the target steering angle calculating unit 70 (step S30).

Subsequently, steering is controlled by the steering unit 80 (step S40).

Figure 3:
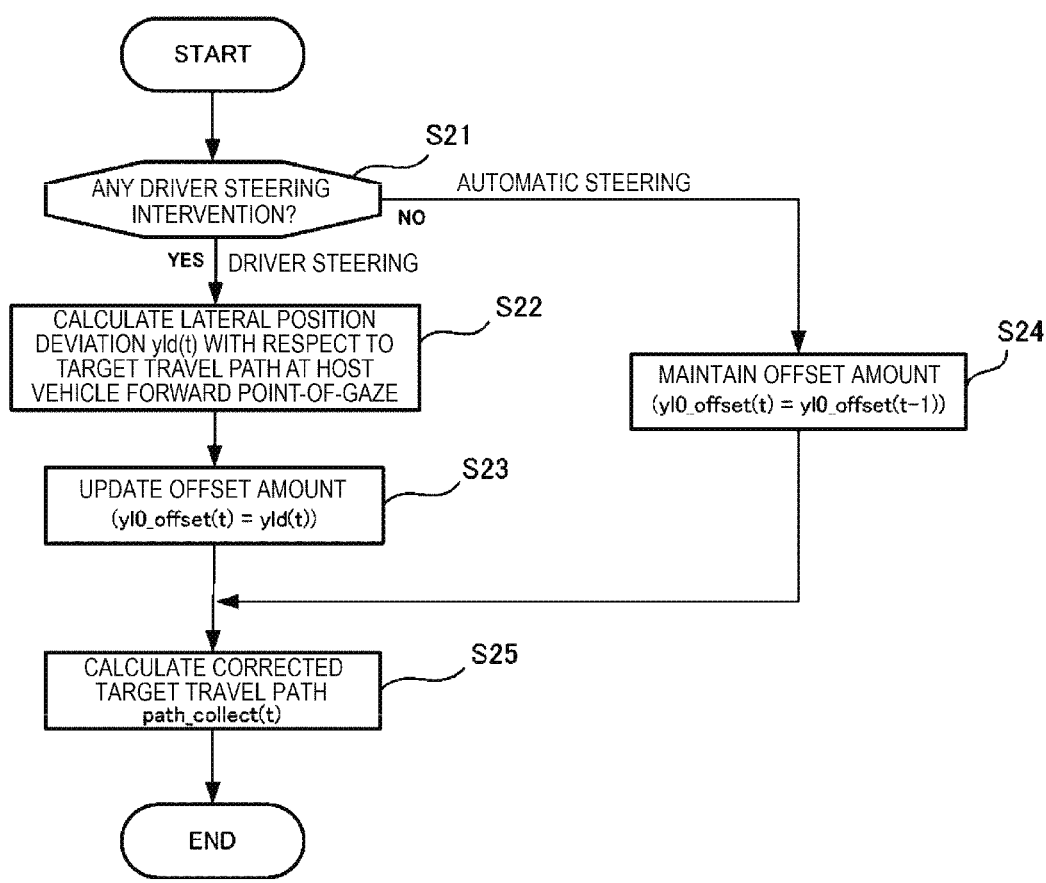
FIG. 3 is a flowchart showing details of the vehicle control method according to the first embodiment.

Next, an operation of the offset amount calculating unit 60 that accords with a presence or absence of a driver steering intervention will be described, using a flowchart of FIG. 3. FIG. 3 shows a detailed operation of step S20 of FIG. 2, and is such that each step is executed while the vehicle is traveling.

Firstly, it is determined by the driver intervention detecting unit 50 whether or not there is a driver steering intervention (step S21).

When a driver steering intervention is detected in step S21, the host vehicle forward point-of-gaze and the lateral position deviation yld(t) with respect to the original target travel path Path_map (t) that passes through the map point sequence are calculated (step S22).

Subsequently, an offset amount yl0_offset(t) for calculating the corrected target travel path Path_collect (t) is adopted as the lateral position deviation yld(t) from the target travel path Path_map (t) at the host vehicle forward point-of-gaze, whereby the offset amount yl0_offset(t) is updated (step S23).

Also, when no driver steering intervention is detected in step S21 (a state wherein automatic driving by the system is continuing), or when a state of steering intervention by the driver is interrupted, that is, a shift from a manual driving state to an automatic driving state by the driver's will is detected, a value of the offset amount to date is maintained (step S24).

Further, the corrected target travel path Path_collect (t) is calculated based on the offset amount calculated in step S23 or step S24 and a path passing through a map point sequence calculated by the target travel path calculating unit 40 (step S25), and the target steering angle Target_steer_angle (t) is calculated using the target steering angle calculating unit 70 (step S30 of FIG. 2).

Figure 4:
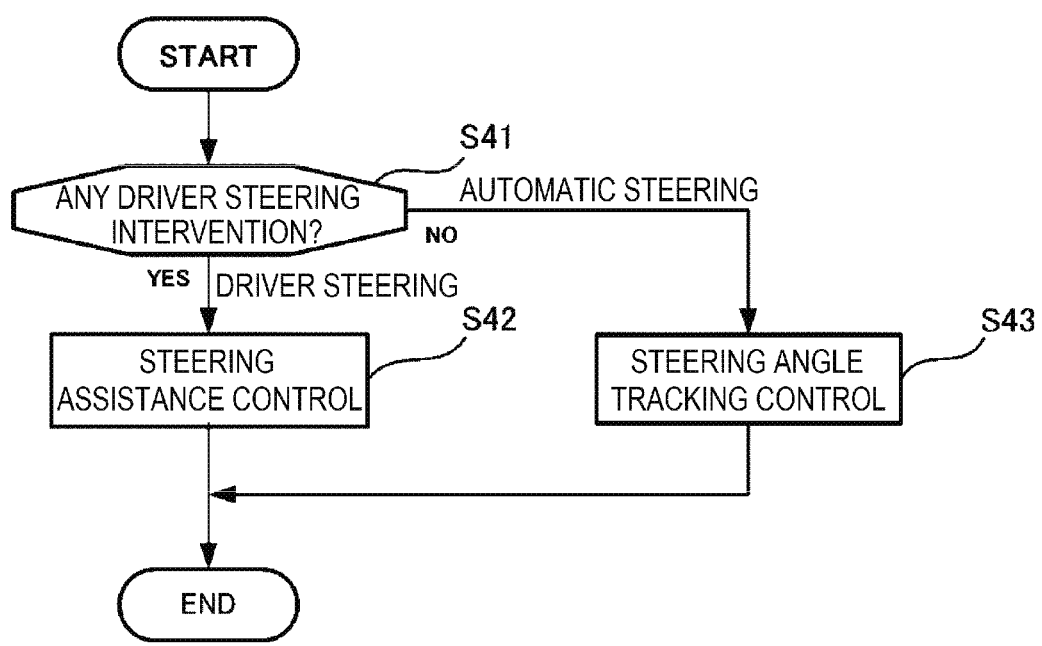
FIG. 4 is a flowchart showing details of the vehicle control method according to the first embodiment.

Next, an operation of the steering unit 80 that accords with the presence or absence of a driver steering intervention will be described, using a flowchart of FIG. 4. FIG. 4 shows a detailed operation of step S40 of FIG. 2, and is such that each step is executed while the vehicle is traveling.

Firstly, it is determined by the driver intervention detecting unit 50 whether or not there is a driver steering intervention (step S41). When a driver steering intervention is detected in step S41, steering assistance control that adds assistance torque to steering torque of the driver is implemented, as in the case of an operation of existing electric power steering (EPS) (step S42). Also, when no driver steering intervention is detected in step S41, the target steering angle Target_steer_angle (t) for following the target travel path Path_map (t) is input from the target steering angle calculating unit 70, and a steering angle tracking control that causes an actual steering angle to track the target steering angle Target_steer_angle (t) is implemented (step S43).

Figure 5:
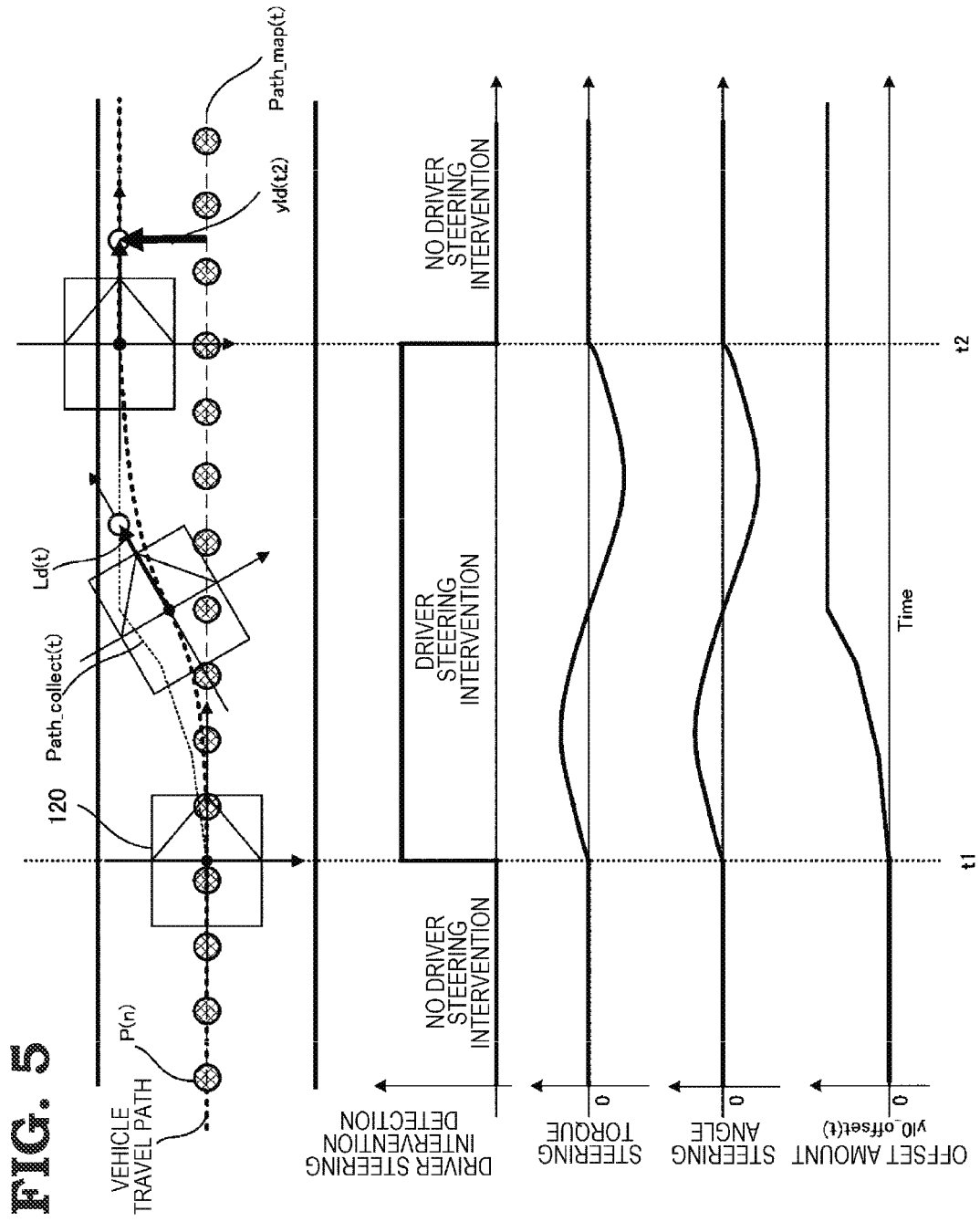
FIG. 5 is a drawing showing an operation when the vehicle control device according to the first embodiment is applied.

FIG. 5 is a drawing that illustrates a process of the offset amount calculating unit 60 together with a passing of time, and shows reciprocal transitions of a vehicle travel path, a driver steering intervention detection, a steering torque, a steering angle, and an offset amount, with a horizontal axis as a time t.

In FIG. 5, a steering angle tracking control is implemented in such a way that a host vehicle 120 follows a map point sequence P(n) when time t<t1. The target travel path Path_map (t) for passing through the map point sequence P(n) is input into the offset amount calculating unit 60 from the target travel path calculating unit 40, but as no driver steering intervention is being detected by the driver intervention detecting unit 50, the offset amount yl0_offset(t) is maintained (constant at 0 m in FIG. 5).

Next, when time t=t1, a driver steering intervention is detected by the driver intervention detecting unit 50. Subsequently, while t1<time t<t2, the driver steering intervention is continued. At this time, the lateral position deviation yld(t) from the target travel path Path_map (t) at a host vehicle forward point-of-gaze Ld(t) is calculated using the following Expression 1 in step S22 of FIG. 3, and a steering assistance control is implemented using step S42 of FIG. 4.

That is, this is a state wherein the driver is moving to a desired position by his or her own will.

In this embodiment, the lateral position deviation yld(t) from the original target travel path Path_map (t) at the host vehicle forward point-of-gaze Ld(t) is calculated, as shown in the following Expression 1, reflected in the offset amount yl0_offset(t), and adopted as an offset amount with respect to the original target travel path Path_map (t). In Expression 1, yl0(t) indicates a lateral position deviation between a host vehicle position and the target travel path Path_map (t), and el0(t) indicates an angle deviation from the target travel path Path_map (t) at a host vehicle forward point-of-gaze.

Math. 1

$$yl0\_\text{offset}(t) = yl0(t) + el0(t) \times Ld(t) \quad (1)$$

Next, when t>t2, the manual driving state has been switched to the automatic driving state again by the driver intervention detecting unit 50. Herein, an offset amount yl0_offset(t2) when t=t2 is maintained using step S24 of FIG. 3.

Figure 6:
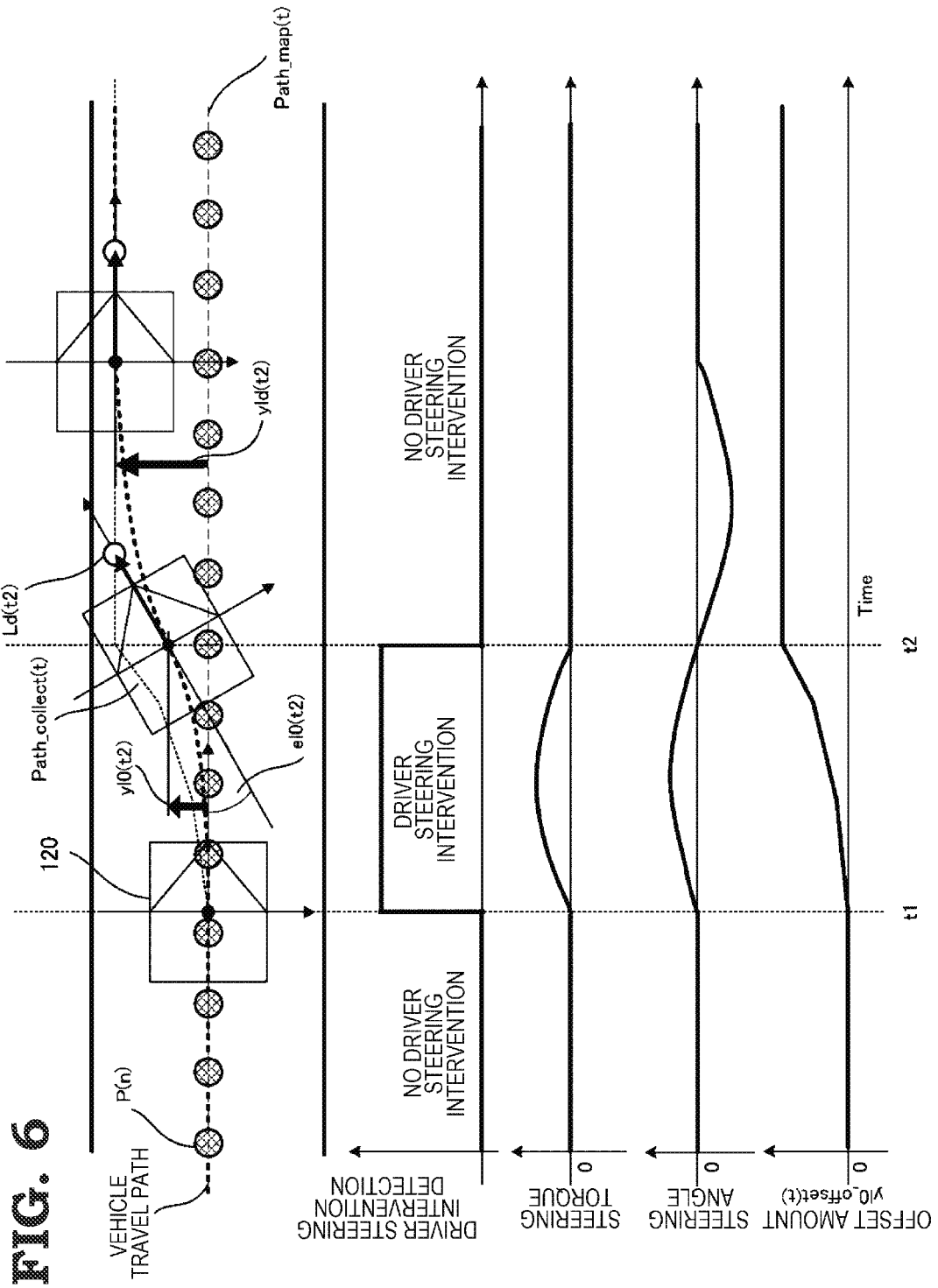
FIG. 6 is a drawing showing another example of an operation when the vehicle control device according to the first embodiment is applied.

FIG. 6 is a drawing showing another example of an operation when the vehicle control device 110 is applied, and is a drawing corresponding to FIG. 5.

In FIG. 6, a time of manual driving by the driver is short, and a switch has been made to automatic driving in a state wherein there is an angle deviation el0(t2) with respect to the original target travel path Path_map (t). In this case too, an offset amount wherein an amount of angle deviation el0(t) at a forward point-of-gaze is taken into consideration can be calculated using Expression 1, because of which a subsequent driving assistance operation can be carried out smoothly.

Figure 7:
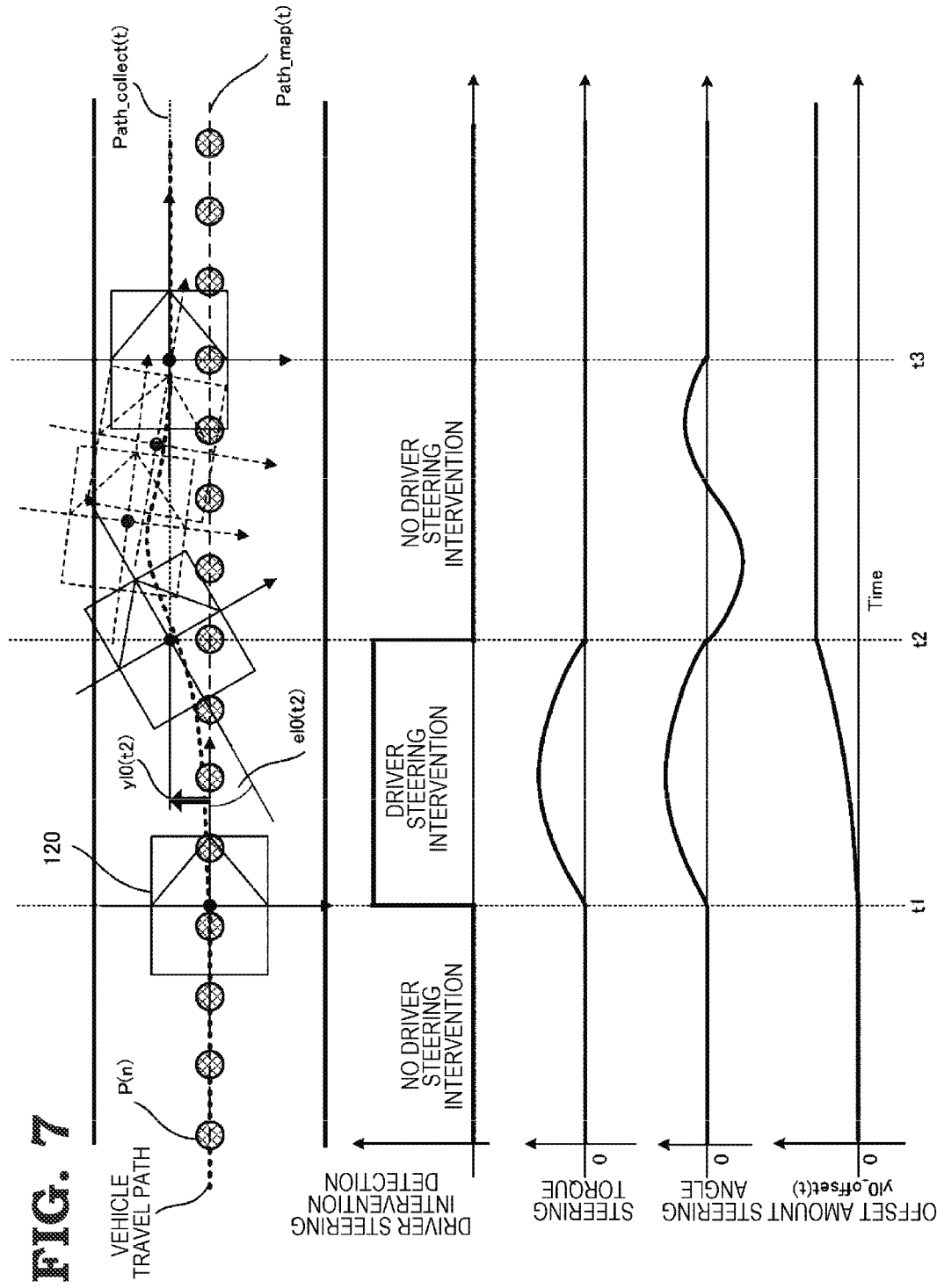
FIG. 7 is a drawing showing an operation when an existing vehicle control device is applied.

FIG. 7 is a drawing showing an operation when the vehicle control device shown in Patent Literature 1 is applied to the same situation as that in FIG. 6. An existing method is such that a time when t1<time t≤t2 is short, and the angle deviation el0(t2) remains with respect to the original target travel path Path_map (t) when time t=t2. In this case too, however, an offset amount reflected in a subsequent path following control is only a lateral position deviation yl0(t2) between the host vehicle position and the original target travel path Path_map (t), because of which behavior of steering by a steering device when t2<time t S t3, or a travel path, becomes vibratory, and the operation becomes unstable.

Also, in order to avoid the situation of FIG. 7, a condition that the angle deviation el0(t2) between the original target travel path Path-map (t) and the host vehicle 120 is equal to or less than a threshold is provided when causing the offset amount with respect to the original target travel path Path_map (t) to be reflected, whereby stability of a subsequent operation can be secured, as in Patent Literature 1, but this measure limits conditions of use of the offsetting function, and convenience is lost.

Figure 8:
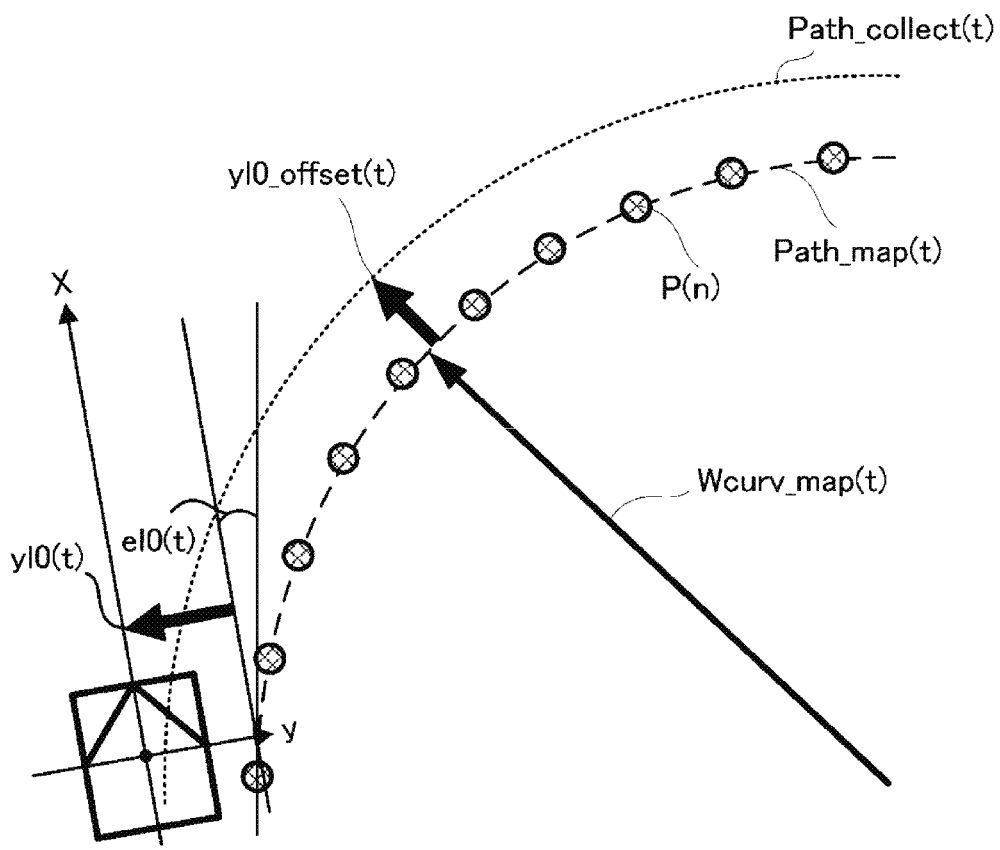
FIG. 8 is a drawing illustrating a process of a target steering angle calculating unit of the vehicle control device according to the first embodiment.

FIG. 8 is a drawing illustrating a process of the target steering angle calculating unit 70. The target travel path calculating unit 40 is such that the target travel path Path_map (t), which is a path for traveling over a map point sequence, is expressed in the following Expression 2 based on information relating to the vehicle position and direction detecting unit 10 and the road map data 20. Also, the offset amount yl0_offset(t) when moving in a traffic lane owing to a driver steering intervention is output by the offset amount calculating unit 60. Herein, a corrected target travel path wherein the offset amount yl0_offset(t) is reflected in the lateral position deviation yl0(t) from the host vehicle position and a path curvature radius W_curv_map(t) becomes a Path_collect(t) with respect to the target travel path Path_map (t), and is expressed in the following Expression 3. Note that dc(t) is a path curvature change, and X is a travel direction distance.

Math. 2

$$\text{Path\_map}(t) = dC(t) \times X^3 + 1/\{2 \times W\_curv\_map(t)\} \times X^2 + el0(t) \times X + yl0(t) \quad (2)$$

$$\text{Path\_collect}(t) = dC(t) \times X^3 + 1/[2 \times \{W\_curv\_map(t) + yl0\_\text{offset}(t)\}] \times X^2 + el0(t) \times X + \{yl0(t) - yl0\_\text{offset}(t)\} \quad (3)$$

As shown in Expression 3, the offset amount yl0_offset(t) is not only an intercept of Expression 2 (a zero-order term), but is also taken into consideration as an offset amount in a second-order term.

Figure 9:
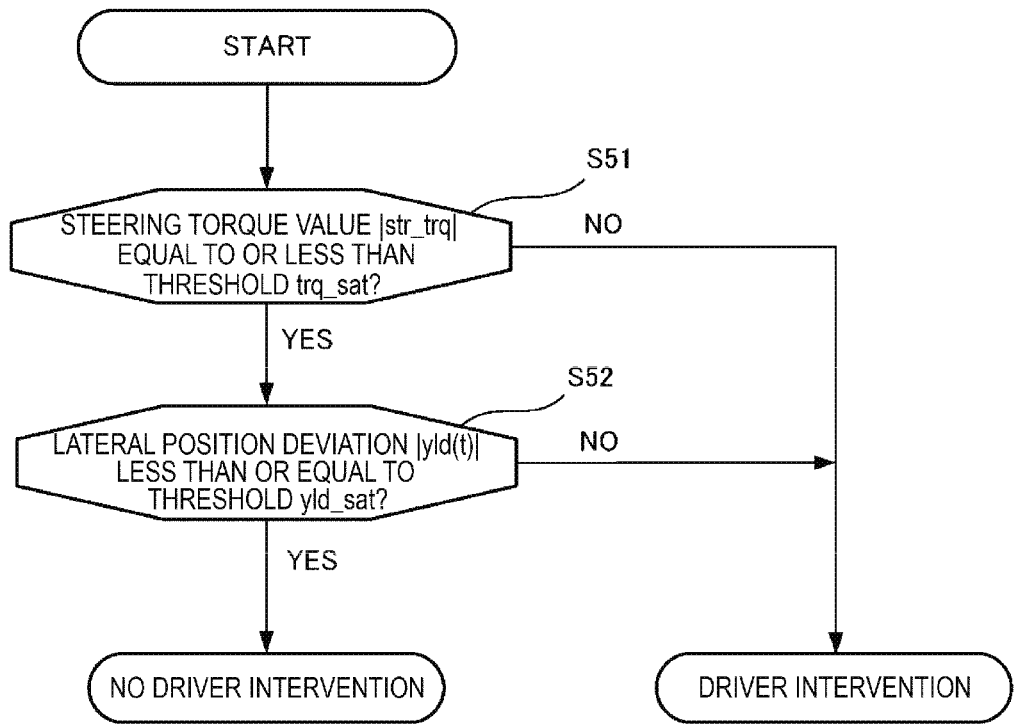
FIG. 9 is a flowchart showing details of an operation of a driver intervention detecting unit of the vehicle control device according to the first embodiment.

FIG. 9 is a flowchart showing a detailed operation of the driver intervention detecting unit 50. Firstly, the driver intervention detecting unit 50 determines whether or not a magnitude of a driver steering torque value str_trq input from the vehicle sensor 30 is greater than a threshold trq_sat (step S51).

When the steering torque value str_trq is equal to or less than the threshold trq_sat in step S51, the driver intervention detecting unit 50 determines whether or not a magnitude of the lateral position deviation yld(t) from the original target travel path Path_map (t) at the host vehicle forward point-of-gaze Ld(t) is greater than a threshold yld_sat (step S52).

When a result of the determination in step S52 is that the lateral position deviation yld(t) is equal to or less than the threshold yld_sat, it is determined that there is no driver steering intervention. Also, when the threshold is exceeded in step S51 or step S52, it is determined that there is a state wherein a driver steering intervention is being detected.

Figure 10:
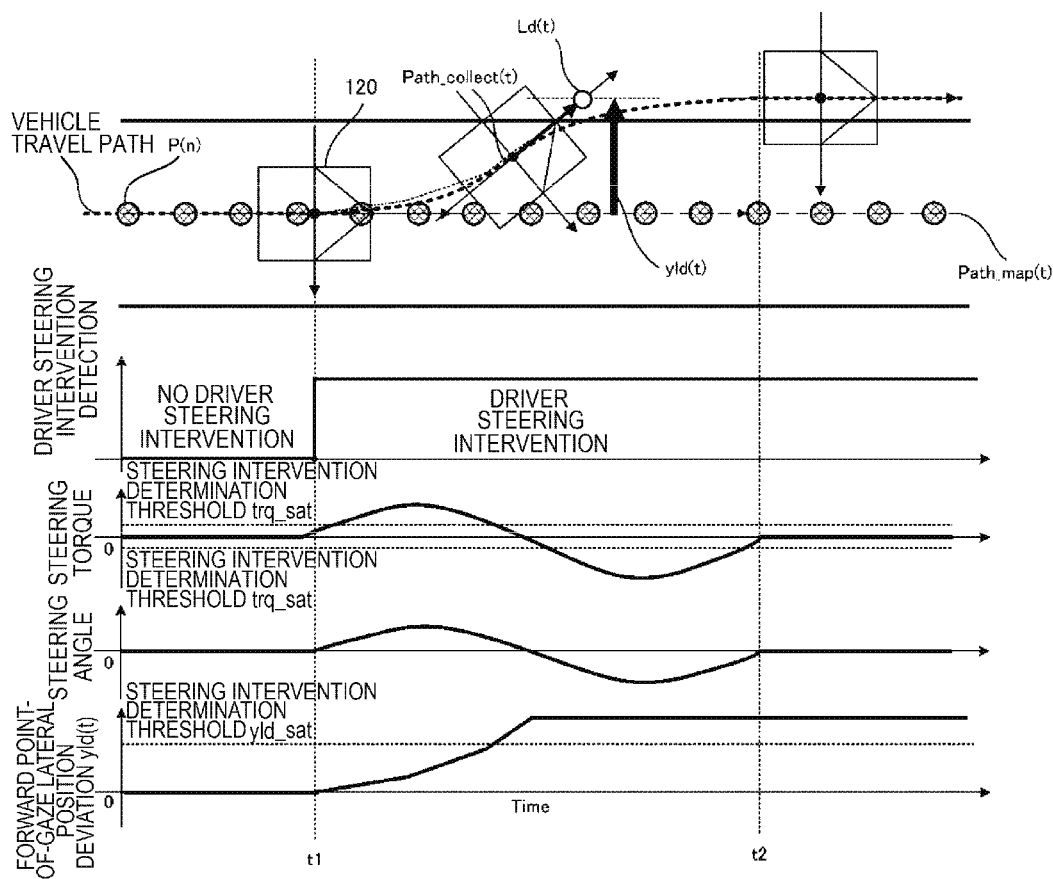
FIG. 10 is a drawing showing another example of an operation when the vehicle control device according to the first embodiment is applied.

FIG. 10 is a drawing showing another example of an operation when the vehicle control device 110 is applied, and is a drawing corresponding to FIG. 5 or FIG. 6. FIG. 10 shows an operation when the host vehicle 120 is caused to evacuate onto a hard shoulder owing to a driver steering intervention. In the case of FIG. 10, a driver steering intervention is implemented when time t=t1, but as the magnitude of the lateral position deviation yld(t) at a forward point-of-gaze exceeds the threshold yld_sat even though steering torque decreases, there is no return to an automatic driving state, despite there being a state wherein the host vehicle 120 is traveling inside a traffic lane. Because of this, an operation of evacuating to a hard shoulder owing to a maneuver by the driver is not prevented.

In this way, the vehicle control device 110 according to the first embodiment continuously calculates an offset amount and the corrected target travel path Path_collect (t) from a driver steering intervention being detected and a switch being made from automatic driving to manual driving until a switch is made back to automatic driving, and when switching to automatic driving, the vehicle control device 110 applies a final value during manual driving of the continuously calculated offset value to the subsequent automatic driving, and uses the lateral position deviation yld(t) from the target travel path Path_map (t) at a host vehicle forward point-of-gaze as the offset amount, because of which the vehicle control device 110 can calculate the offset amount even in a state wherein the angle deviation el0(t) remains. This means that not only can a smoother state transition be carried out, but also a utilization range or a utilization condition of the relevant function is relaxed, because of which the convenience of the automatic driving function can be increased.

Also, the vehicle control device 110 according to the first embodiment is such that when causing driver assistance to be ended using driver steering intervention, the offset amount is reflected even when the driver causes an operation amount to decrease before a condition is fulfilled, and a generation of a control torque such that the vehicle travels in a traffic lane center can be prevented.

Second Embodiment

Next, a vehicle control device according to a second embodiment will be described. A configuration of the vehicle control device according to the second embodiment is the same as that of the first embodiment shown in FIG. 1, because of which a description will be given using FIG. 1, and a redundant description will be omitted. The second embodiment describes an embodiment wherein an offset amount is calculated based on a lateral position deviation at a forward point-of-gaze.

Figure 11:
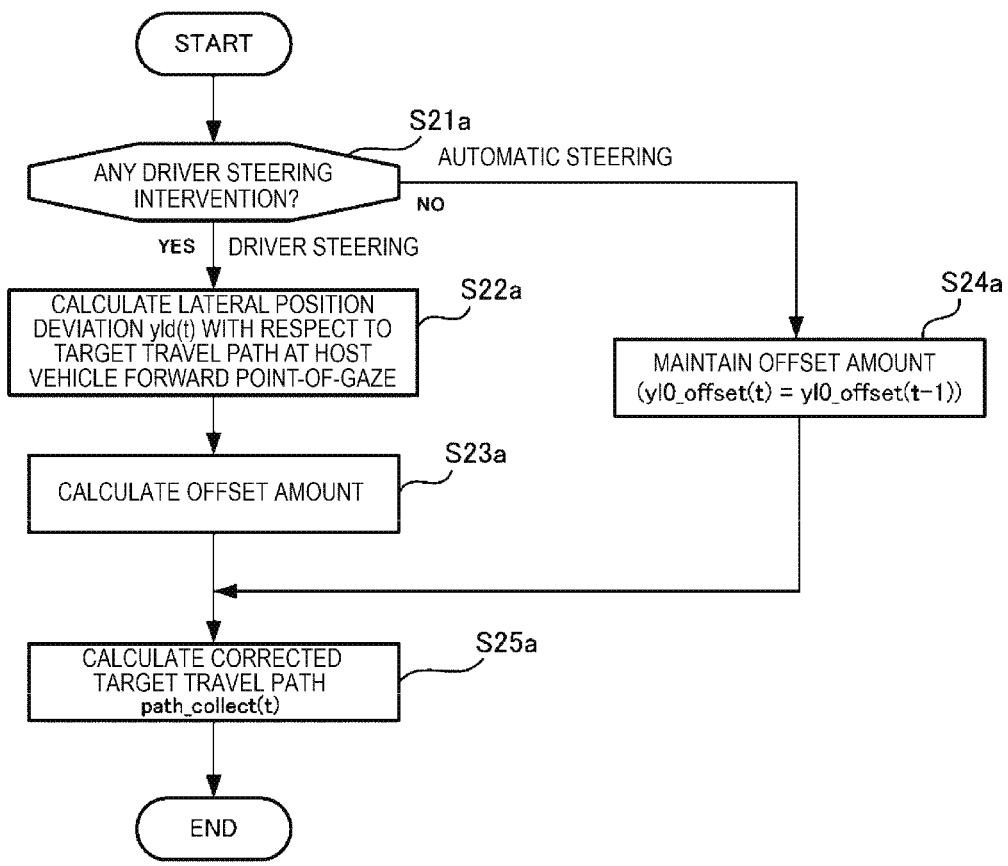
FIG. 11 is a flowchart showing details of a vehicle control method according to a second embodiment.

FIG. 11 is a drawing showing an operation of the offset amount calculating unit 60 of the vehicle control device according to the second embodiment, and is a drawing that corresponds to FIG. 3 described in the first embodiment. FIG. 11 shows a detailed operation of a step corresponding to step S20 of FIG. 2 of the first embodiment, and is such that each step is executed while the vehicle is traveling. Also, as other steps, that is, a step of calculating a path passing through a map point sequence, a target steering angle calculation step, and a steering control step, are the same as steps of FIG. 2 described in the first embodiment, a description will be omitted.

In a flowchart of FIG. 11, firstly, it is determined by the driver intervention detecting unit 50 whether or not there is a driver steering intervention (step S21a).

When a driver steering intervention is detected in step S21a, the lateral position deviation yld(t) from the original target travel path Path_map (t) that passes through the map point sequence at the host vehicle forward point-of-gaze is calculated (step S22a).

Subsequently, the offset amount yl0_offset(t) for calculating the corrected target travel path Path_collect (t) based on the lateral position deviation yld(t) is calculated and updated (step S23a).

Also, when no driver steering intervention is detected in step S21a (a state wherein automatic driving by the system is continuing), or when a state of steering intervention by the driver is interrupted, that is, a shift from a manual driving state to an automatic driving state by the driver's will is detected, a value of the offset amount to date is maintained (step S24a).

Further, the corrected target travel path Path_collect (t) is calculated based on the offset amount calculated in step S23a or step S24a and a path passing through a map point sequence calculated by the target travel path calculating unit 40 (step S25a), and the target steering angle Target_steer_angle (t) is calculated using the target steering angle calculating unit 70 (step S30 of FIG. 2).

Figure 12:
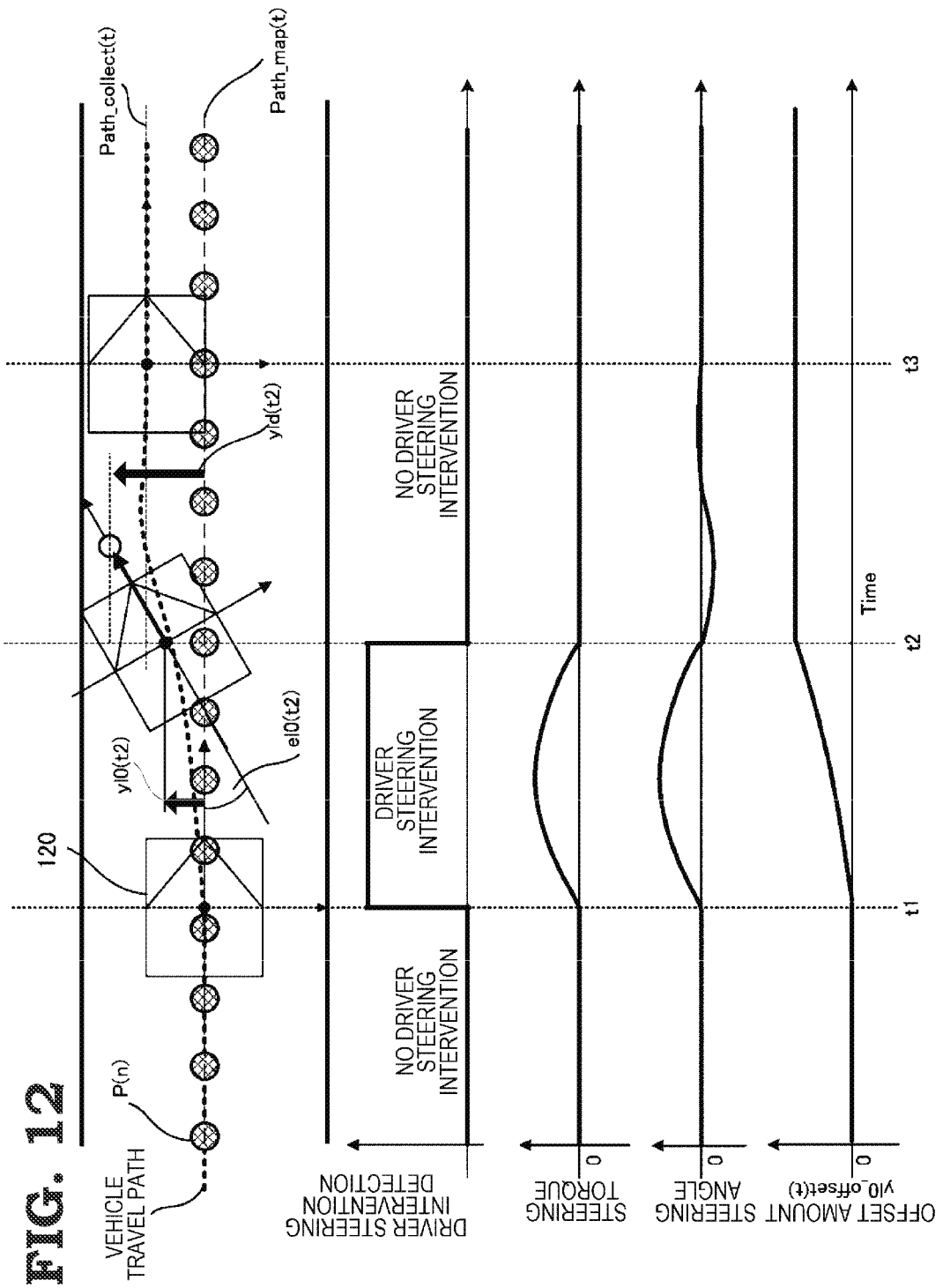
FIG. 12 is a drawing showing an operation when a vehicle control device according to the second embodiment is applied.

FIG. 12 is a drawing that illustrates a process of the offset amount calculating unit 60 of the second embodiment together with a passing of time, and shows reciprocal transitions of a vehicle travel path, a driver steering intervention detection, a steering torque, a steering angle, and an offset amount, with a horizontal axis as a time t.

In FIG. 12, a steering angle tracking control is implemented in such a way that the host vehicle 120 follows the map point sequence P(n) when time t<t1. The target travel path Path_map (t) for passing through the map point sequence P(n) is input into the offset amount calculating unit 60 from the target travel path calculating unit 40, but as no driver steering intervention is being detected by the driver intervention detecting unit 50, the offset amount yl0_offset (t) is maintained.

Next, when time t=t1, a driver steering intervention is detected by the driver intervention detecting unit 50. Subsequently, while t1<time t c t2, the driver steering intervention is continued. At this time, the lateral position deviation yld(t) from the target travel path Path_map (t) at the host vehicle forward point-of-gaze Ld(t) is calculated using the following Expression 4 in step S22a of FIG. 11, and a steering assistance control is implemented using step S42 of FIG. 4. That is, this is a state wherein the driver is moving to a desired position by his or her own will.

In this embodiment, the offset amount yl0_offset(t) is calculated based on the lateral position deviation yld(t) from the target travel path Path_map (t) at the host vehicle forward point-of-gaze Ld(t) as shown in the following Expression 4, and adopted as an offset amount with respect to the original target travel path Path_map (t).

FIG. 12 shows an operation whereby an average value of the lateral position deviation yld(t) at a time of a driver steering intervention is calculated as yl0_offset(t).

Math. 3

$$yl0\_offset(t)=yl0(t)+el0(t) \times Ld(t) \quad (4)$$

Next, when time t>t2, the manual driving has been switched to the automatic driving state again by the driver intervention detecting unit 50. Herein, the offset amount yl0_offset(t2) that is a final value of an average value of the lateral position deviation yld(t) during the driver steering intervention is maintained using step S24a of FIG. 11, and output as the offset amount yl0_offset(t).

When comparing with an operation in a case of applying Patent Literature 1 of FIG. 7, the second embodiment is such that an offset amount reflected after a steering intervention is calculated based on the lateral position deviation yld(t) at the host vehicle forward point-of-gaze rather than the lateral position deviation yl0(t) from the host vehicle position, because of which it is understood that a driving assistance operation after the steering intervention is improved.

In the second embodiment too, in the same way as in the first embodiment, the target steering angle Target_steer_angle(t) is calculated by the target steering angle calculating unit 70. In the target travel path calculating unit 40, the target travel path Path_map (t), which is a path for traveling over a map point sequence, is expressed in the following Expression 5 based on information relating to the vehicle position and direction detecting unit 10 and the road map data 20. Also, the offset amount yl0_offset(t) calculated when moving in a traffic lane owing to a driver steering intervention is output by the offset amount calculating unit 60. Herein, a corrected target travel path wherein the offset amount yl0_offset(t) is reflected in the lateral position deviation yl0(t) from the host vehicle position and the path curvature radius W_curv_map(t) becomes the Path_collect(t) with respect to the target travel path Path_map (t), and is expressed in the following Expression 6. Note that dc(t) is a path curvature change, and X is a travel direction distance.

Math. 4

$$Path\_map(t)=dC(t) \times X^3+1/\{2 \times W\_curv\_map(t)\} \times X^2+el0(t) \times X+yl0(t) \quad (5)$$

$$Path\_collect(t)=dC(t) \times X^3+1/[2 \times \{W\_curv\_map(t)+yl0\_offset(t)\}] \times X^2+el0(t) \times X+(yl0(t)-yl0\_offset(t)) \quad (6)$$

In this way, the vehicle control device 110 according to the second embodiment uses the lateral position deviation yld(t) from the target travel path Path_map (t) at a host vehicle forward point-of-gaze as the offset amount, because of which the vehicle control device 110 can calculate the offset amount even in a state wherein the angle deviation el0(t) remains, whereby a smoother state transition can be carried out.

Also, in the second embodiment, the offset amount yl0_offset(t) is calculated as an average value of the lateral position deviation yld(t) from a target travel path at a forward point-of-gaze during a steering intervention, but not being limited to this method, an offset amount more in line with a preference of the driver can be calculated by adopting a method that uses a final value when switching, or a method that calculates an average value within a range to which a condition is attached.

Third Embodiment

Next, a vehicle control device according to a third embodiment will be described. A configuration of the vehicle control device according to the third embodiment is the same as that of the first embodiment shown in FIG. 1, because of which a description will be given using FIG. 1, and a redundant description will be omitted. The third embodiment describes an embodiment wherein a final value when switching to automatic driving is adopted as an offset amount.

Figure 13:
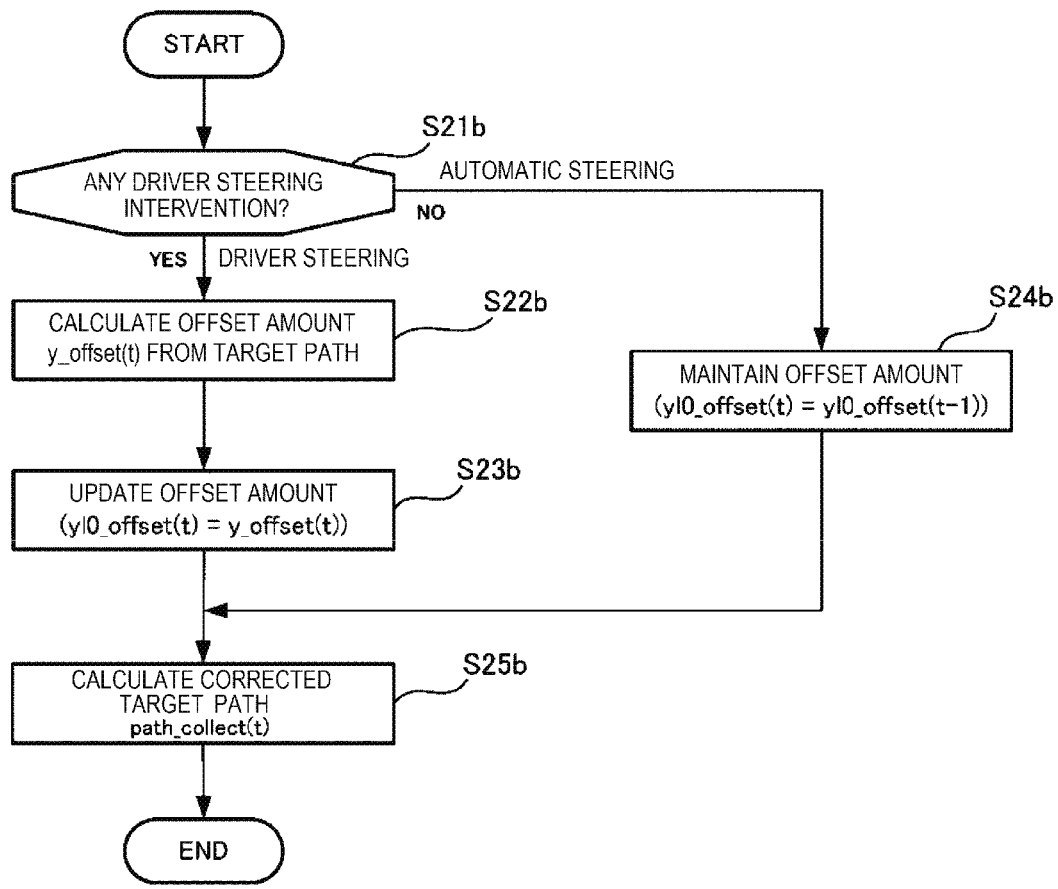
FIG. 13 is a flowchart showing details of a vehicle control method according to a third embodiment.

FIG. 13 is a drawing showing an operation of the offset amount calculating unit 60 of the vehicle control device according to the third embodiment, and is a drawing that corresponds to FIG. 3 described in the first embodiment. FIG. 13 shows a detailed operation of a step corresponding to step S20 of FIG. 2 of the first embodiment, and is such that each step is executed while the vehicle is traveling. Also, as other steps, that is, a step of calculating a path passing through a map point sequence, a target steering angle calculation step, and a steering control step, are the same as steps of FIG. 2 described in the first embodiment, a description will be omitted.

In a flowchart of FIG. 13, firstly, it is determined by the driver intervention detecting unit 50 whether or not there is a driver steering intervention (step S21b).

When a driver steering intervention is detected in step S21b, an offset amount y_offset(t) is calculated based on the lateral position deviation yl0(t) between the host vehicle position and the original target travel path Path_map (t) that passes through the map point sequence, or the angle deviation el0(t) (step S22b).

Subsequently, the offset amount yl0_offset(t) is updated by adopting the offset amount y_offset(t) calculated in step S22b as the offset amount yl0_offset(t) for calculating a corrected target travel path (step S23b).

Also, when no driver steering intervention is detected in step S21b (a state wherein automatic driving by the system is continuing), or when a state of steering intervention by the driver is interrupted, that is, a shift from a manual driving state to an automatic driving state by the driver's will is detected, a value of the offset amount to date is maintained (step S24b).

Further, the corrected target travel path Path_collect (t) is calculated based on the offset amount calculated in step S23b or step S24b and a path passing through a map point sequence calculated by the target travel path calculating unit 40 (step S25b), and the target steering angle Target_steer_angle (t) is calculated using the target steering angle calculating unit 70 (step S30 of FIG. 2).

Figure 14:
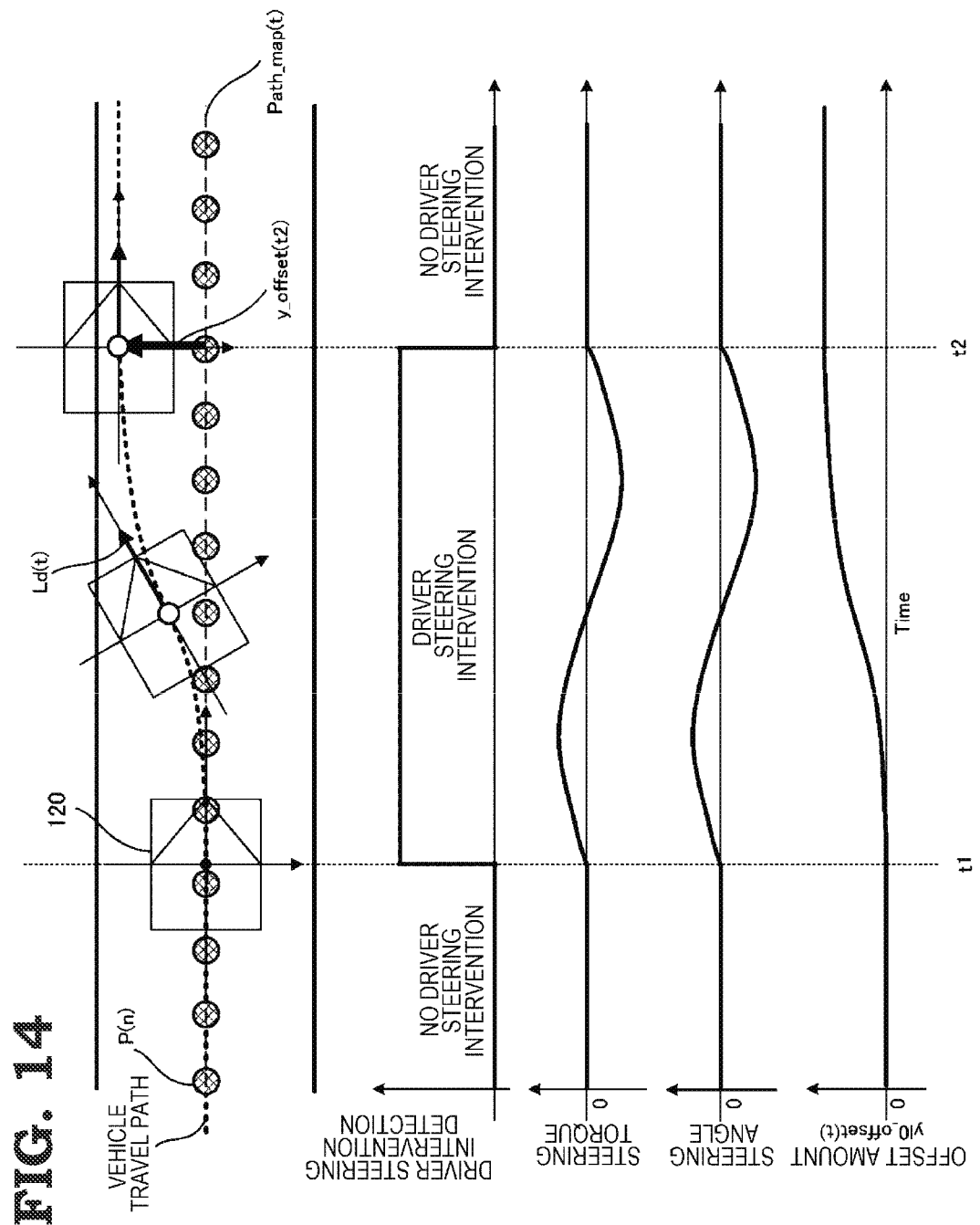
FIG. 14 is a drawing showing an operation when a vehicle control device according to the third embodiment is applied.

FIG. 14 is a drawing that illustrates a process of the offset amount calculating unit 60 according to the third embodiment together with a passing of time, and shows reciprocal transitions of a vehicle travel path, a driver steering intervention detection, a steering torque, a steering angle, and an offset amount, with a horizontal axis as a time t.

In FIG. 14, a steering angle tracking control is implemented in such a way that the host vehicle 120 follows the map point sequence P(n) when time t<t1. The target travel path Path_map (t) for passing through the map point sequence P(n) is input into the offset amount calculating unit 60 from the target travel path calculating unit 40, but as no driver steering intervention is being detected by the driver intervention detecting unit 50, the offset amount yl0_offset (t) is maintained.

Next, when time t=t1, a driver steering intervention is detected by the driver intervention detecting unit 50. Subsequently, while t1<time t<t2, the driver steering intervention is continued. At this time, the offset amount y_offset(t) is calculated based on the lateral position deviation yl0($t$) between the original target travel path Path_map (t) passing through the map point sequence and the host vehicle position, or the angle deviation el0($t$), in step S22b of FIG. 13, and a steering assistance control is implemented using step S42 of FIG. 4. That is, this is a state wherein the driver is moving to a desired position by his or her own will. In FIG. 14, the lateral position deviation yl0($t$) between the original target travel path Path_map (t) and the host vehicle position is adopted as the offset amount yl0_offset(t).

Next, when time t>t2, the manual driving state has been switched to the automatic driving state again by the driver intervention detecting unit 50. Herein, the offset amount yl0_offset(t2) when time t=t2 is maintained using step S24b of FIG. 13, and output as the offset amount yl0_offset(t).

Figure 15:
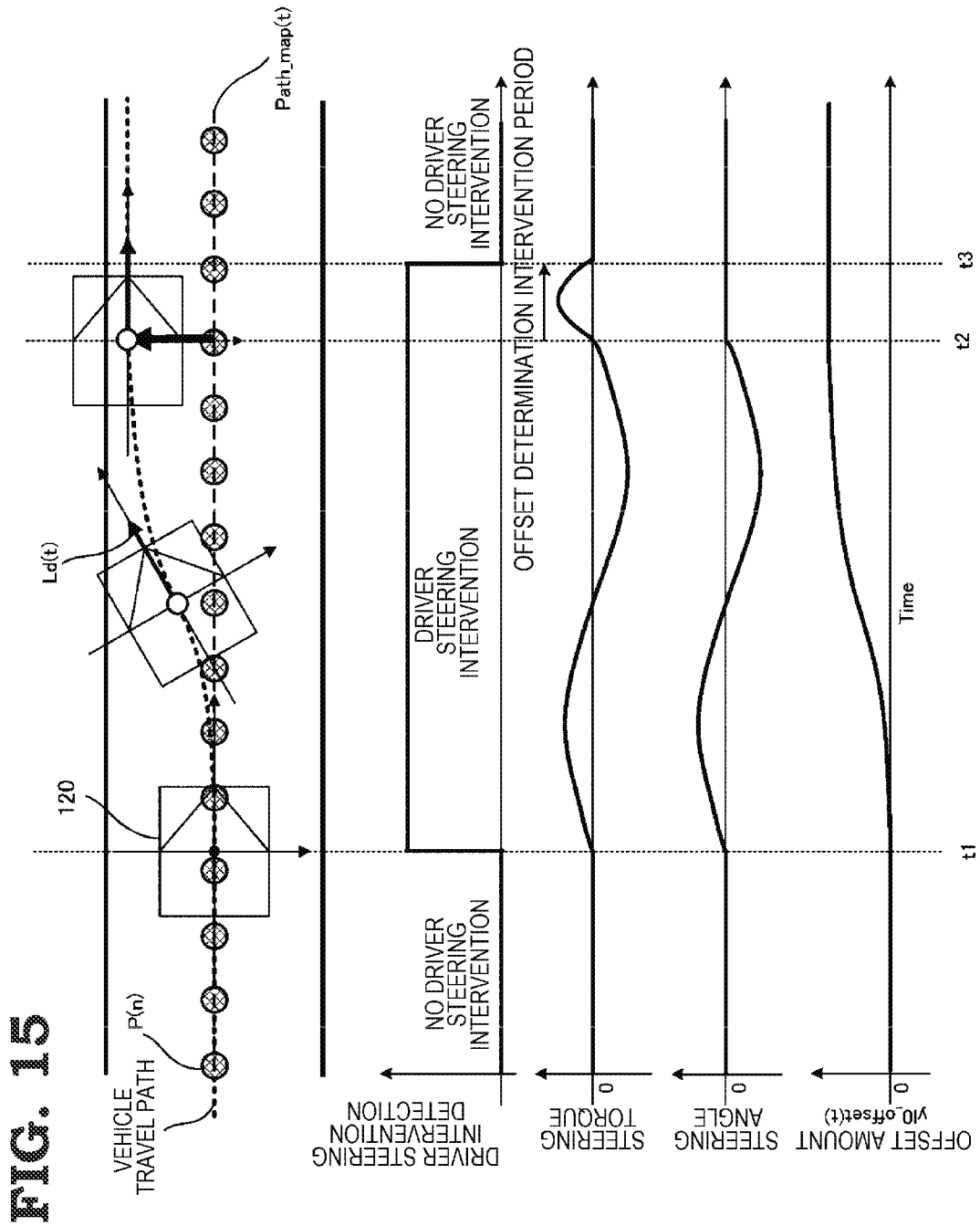
FIG. 15 is a drawing showing another example of an operation when an existing vehicle control device is applied.

FIG. 15 is a drawing showing another example of an operation when the kind of existing vehicle control device disclosed in Patent Literature 1 is applied.

The existing method is such that as a period during which it is determined whether or not an offset amount is to be reflected is provided when t2<time 2≤t3, control torque such that the host vehicle 120 follows the original target travel path Path_map (t) is generated from a control device during the period, because of which a driver needs to cause torque to be generated in a direction opposing the control torque, and a feeling of discomfort occurs. Also, when the driver stops a steering intervention before the offset reflection determination period, the host vehicle 120 starts moving in such a way as to return to the original target travel path Path_map (t) (interference with the driver).

Meanwhile, the vehicle control device according to the third embodiment is such that no time restriction for causing an offset amount to be reflected is provided, and an offset amount at a point at which steering intervention is stopped is reflected, because of which the existing interference can be restricted.

In this way, in the third embodiment too, in the same way as in the first embodiment, the target steering angle Target_steer_angle(t) is calculated by the target steering angle calculating unit 70. In the target travel path calculating unit 40, the target travel path Path_map (t), which is a path for traveling over a map point sequence, is expressed in the following Expression 7 based on information relating to the vehicle position and direction detecting unit 10 and the road map data 20. Also, the offset amount yl0_offset(t) calculated when moving in a traffic lane owing to a driver steering intervention is output by the offset amount calculating unit 60. Herein, a corrected target travel path wherein the offset amount yl0_offset(t) is reflected in the lateral position deviation yl0($t$) from the host vehicle position and the path curvature radius W_curv_map(t) becomes the Path_collect (t) with respect to the target travel path Path_map (t), and is expressed in the following Expression 8. Note that dc(t) is a path curvature change, and X is a travel direction distance.

Math. 5

$$\text{Path\_map}(t) = dC(t) \times X^3 + 1/\{2 \times W\_\text{curv\_map}(t)\} \times X^2 + el0(t) \times X + yl0(t) \quad (7)$$

$$\text{Path\_collect}(t) = dC(t) \times X^3 + 1/[2 \times \{W\_\text{curv\_map}(t) + yl0\_\text{offset}(t)\}] \times X^2 + el0(t) \times X + \{yl0(t) - yl0\_\text{offset}(t)\} \quad (8)$$

In this way, the vehicle control device according to the third embodiment continuously calculates an offset amount and a corrected target travel path from a driver steering intervention being detected and a switch being made from automatic driving to manual driving until a switch is made back to automatic driving, and when switching to automatic driving, the vehicle control device applies a final value during manual driving of the continuously calculated offset value to the subsequent automatic driving, whereby a utilization range or a utilization condition of the relevant function is relaxed, because of which the convenience of the automatic driving function can be increased.

Also, in the third embodiment, the lateral position deviation yl0($t$) between the original target travel path Path_map (t) and the host vehicle 120 is calculated as the offset amount yl0_offset(t) when calculating the offset amount yl0_offset (t), but not being limited to this method, an offset amount more in line with a preference of the driver can be calculated by calculating taking the angle deviation el0($t$) of the host vehicle 120 into consideration too.

Figure 16:
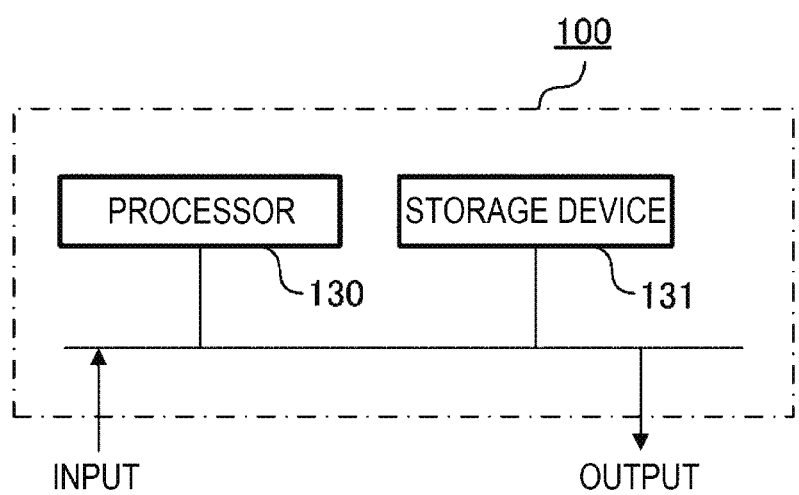
FIG. 16 is a drawing of an example of hardware of a computation control unit configuring a vehicle control device.

Heretofore, a vehicle control device and a vehicle control method according to first to third embodiments of the present application have been described, but the target travel path calculating unit 40, the driver intervention detecting unit 50, the offset amount calculating unit 60, the target steering angle calculating unit 70, and the steering unit 80 configuring the computation control unit 100 included in the vehicle control device 110 described in each embodiment are configured of a processor 130 and a storage device 131, as shown by a hardware example of FIG. 16. Although not shown in the drawing, the storage device 131 includes a volatile storage device, such as a random access memory, and a non-volatile auxiliary storage device, such as a flash memory. Also, a hard disk auxiliary storage device may be included instead of a flash memory. The processor 130 executes a program input from the storage device 131. In this case, the program is input into the processor 130 from the auxiliary storage device via the volatile storage device. Also, the processor 130 may output data such as a computation result to the volatile storage device of the storage device 131, or may save the data in the auxiliary storage device via the volatile storage device.

Although the present application is described above in terms of various exemplifying embodiments and implementations, it should be understood that the various features, aspects, and functions described in one or more of the individual embodiments are not limited in their applicability to the particular embodiment with which they are described, but instead can be applied, alone or in various combinations, to one or more other embodiments. It is therefore understood that numerous modifications that have not been exemplified can be devised without departing from the scope of the present application. For example, at least one constituent component may be modified, added, or eliminated. Furthermore, at least one of the constituent components mentioned in at least one of the preferred embodiments may be selected and combined with the constituent components mentioned in another preferred embodiment.

REFERENCE SIGNS LIST

10 vehicle position and direction detecting unit, 20 road map data, 30 vehicle sensor, 40 target travel path calculating unit, 50 driver intervention detecting unit, 60 offset amount calculating unit, 70 target steering angle calculating unit, 80 steering unit, 90 road information input unit, 100 computation control unit, 110 vehicle control device, 120 host vehicle, 130 processor, 131 storage device.

The invention claimed is:

1. A vehicle control device, comprising at least one processor configured to:
   calculate a target travel path for causing a host vehicle to travel along a road based on a position of the host vehicle relative to the road;
   detect a driver steering intervention at a time of an automatic steering state of following the target travel path;
   in response to the driver steering intervention, calculate an offset amount with respect to the target travel path based on a lateral position deviation from the target travel path at a forward point-of-gaze of the host vehicle obtained while the driver steering intervention is continuing, and calculate a corrected target travel path in which the offset amount is reflected with respect to the target travel path;
   after the driver steering intervention is finished, calculate a target steering angle for following the corrected target travel path based on a state of the host vehicle; and
   control a steering angle of the host vehicle to enable the host vehicle to follow the corrected target travel path during the driver steering intervention, and control the steering angle of the host vehicle based on the target steering angle in the automatic steering state.

2. A vehicle control device, comprising at least one processor configured to:
   calculate a target travel path for causing a host vehicle to travel along a road based on a position of the host vehicle relative to the road;
   detect a driver steering intervention at a time of an automatic steering state of following the target travel path;
   in response to the driving steering intervention, calculate an offset amount with respect to the target travel path obtained while the driver steering intervention is continuing, and calculate a corrected target travel path in which the offset amount is reflected with respect to the target travel path;
   after the driver steering intervention is finished, calculate a target steering angle for following the corrected target travel path based on a state of the host vehicle;
   control a steering angle of the host vehicle to enable the host vehicle to follow the corrected target travel path during the driver steering intervention, and control the steering angle of the host vehicle based on the target steering angle in the automatic steering state, wherein
   a final value is selected among a plurality of offset values that are calculated from the driver steering intervention being continued until the driver steering intervention finishes and the host vehicle returns to the automatic steering state, as an offset amount for the corrected target travel path in the automatic steering state.

3. A vehicle control device, comprising:
   calculate a target travel path for causing a host vehicle to travel along a road based on a position of the host vehicle relative to the road;
   detect a driver steering intervention at a time of an automatic steering state of following the target travel path;
   in response to the driving steering intervention, calculate an offset amount with respect to the target travel path obtained while the driver steering intervention is continuing based on a lateral position deviation from the target travel path at a forward point-of-gaze of the host vehicle obtained while the driver steering intervention is continuing, and calculate a corrected target travel path in which the offset amount is reflected with respect to the target travel path;
   after the driver steering intervention is finished, calculate a target steering angle for following the corrected target travel path based on a state of the host vehicle; and
   control a steering angle of the host vehicle to enable the host vehicle to follow the corrected target travel path during the driver steering intervention, and control the steering angle of the host vehicle based on the target steering angle in the automatic steering state, wherein
   a final value is selected among a plurality of offset values that are calculated from the driver steering intervention being continued until the driver steering intervention finishes and the host vehicle returns to the automatic steering state, as an offset amount for the corrected target travel path in the automatic steering state.

4. The vehicle control device according to claim 1, wherein
   the at least one processor is further configured to determine whether a state is an automatic driving state or the driver steering state based on a presence or absence of a steering wheel operation by the driver and the lateral position deviation from the target travel path at the forward point-of-gaze of the host vehicle.

5. The vehicle control device according to claim 1, comprising
   a vehicle sensor that detects a steering torque value of the host vehicle, wherein
   the at least one processor is further configured to:
   compare the steering torque value detected by the vehicle sensor and a preset first threshold;
   based on the steering torque value being equal to or less than the first threshold, compare a value of the lateral position deviation with respect to the target travel path at the forward point-of-gaze of the host vehicle and a preset second threshold; and based on the value of the lateral position deviation being equal to or less than the second threshold, determine that there is no driver steering intervention.

6. The vehicle control device according to claim 1, wherein the at least one processor is further configured to calculate the offset amount using the following expression, $$yl0\_\text{offset}(t) = yl0(t) + el0(t) \times Ld(t) \quad \text{Math. 6}$$

Herein, yl0_offset(t) is an offset amount,
yl0($t$) is a lateral position deviation between a host vehicle position and a target travel path,
el0($t$) is an angle deviation at a forward point-of-gaze, and
Ld(t) is a host vehicle forward point-of-gaze.

7. The vehicle control device according to claim 1, wherein the at least one processor is further configured to calculate the target travel path using the following expression, $$\text{Path\_map}(t) = dC(t) \times X^3 + 1/\{2 \times W\_\text{curv\_map}(t)\} \times X^2 + el0(t) \times X + yl0(t) \quad \text{Math. 7}$$

Herein, Path_map(t) is a target travel path,
dC(t) is a path curvature change,
X is a travel direction distance,
W_curv_map(t) is a path curvature radius,
el0($t$) is an angle deviation at a forward point-of-gaze, and
yl0($t$) is a lateral position deviation between a host vehicle position and a target travel path.

8. The vehicle control device according to claim 1, wherein the at least one processor is further configured to calculate the corrected target travel path using the following expression, $$\text{Path\_collect}(t) = dC(t) \times X^3 + 1/[2 \times \{W\_\text{curv\_map}(t) + yl0\_\text{offset}(t)\}] \times X^2 + el0(t) \times X + \{yl0(t) - yl0\_\text{offset}(t)\} \quad \text{Math. 8}$$

Herein, Path_collect(t) is a corrected target travel path,
dC(t) is a path curvature change,
X is a travel direction distance,
W_curv_map(t) is a path curvature radius,
yl0_offset(t) is an offset amount,
el0($t$) is an angle deviation at a forward point-of-gaze, and
yl0($t$) is a lateral position deviation between a host vehicle position and a target travel path.

9. A vehicle control method, comprising:
a first step of detecting relative positions of a host vehicle and a road;
a second step of calculating a target travel path for causing the host vehicle to travel along the road;
a third step of detecting a driver steering intervention at a time of an automatic steering state of following the target travel path;
a fourth step of calculating an offset amount with respect to the target travel path based on the driver steering intervention, and calculating a corrected target travel path in which the offset amount is reflected; and
a fifth step of, after the driver steering intervention is finished, calculating a target steering angle for following the corrected target travel path based on a state of the host vehicle, and
a sixth step of controlling a steering angle of the host vehicle to enable the host vehicle to follow the corrected target travel path during the driver steering intervention, and control the steering angle of the host vehicle based on the target steering angle in the automatic steering state,
wherein
the fourth step calculates the offset amount based on a lateral position deviation from the target travel path at a forward point-of-gaze of the host vehicle obtained while the driver steering intervention is continuing.

10. A vehicle control method, comprising:
a first step of detecting relative positions of a host vehicle and a road;
a second step of calculating a target travel path for causing the host vehicle to travel along the road;
a third step of detecting a driver steering intervention at a time of an automatic steering state of following the target travel path;
a fourth step of calculating an offset amount with respect to the target travel path obtained while the driver steering intervention is continuing based on the driver steering intervention, and calculating a corrected target travel path in which the offset amount is reflected;
a fifth step of, after the driver steering intervention is finished, calculating a target steering angle for following the corrected target travel path based on a state of the host vehicle; and
a sixth step of controlling a steering angle of the host vehicle to enable the host vehicle to follow the corrected target travel path during the driver steering intervention, and control the steering angle of the host vehicle based on the target steering angle in the automatic steering state,
wherein
the fourth step adopts a final value among the offset values calculated from the driver steering intervention being continued until the driver steering intervention finishes and there is a return to the automatic steering state as an offset amount for the corrected target travel path in the automatic steering state.

11. A vehicle control method, comprising:
a first step of detecting relative positions of a host vehicle and a road;
a second step of calculating a target travel path for causing the host vehicle to travel along the road;
a third step of detecting a driver steering intervention at a time of an automatic steering state of following the target travel path;
a fourth step of calculating an offset amount with respect to the target travel path obtained while the driver steering intervention is continuing based on the driver steering intervention, and calculating a corrected target travel path in which the offset amount is reflected with respect to the target travel path;
a fifth step of, after the driver steering intervention is finished, calculating a target steering angle for following the corrected target travel path based on a state of the host vehicle; and
a sixth step of controlling a steering angle of the host vehicle to enable the host vehicle to follow the corrected target travel path during the driver steering intervention, and control the steering angle of the host vehicle based on the target steering angle in the automatic steering state, wherein
the fourth step calculates the offset amount based on a lateral position deviation from the target travel path at a forward point-of-gaze of the host vehicle obtained while the driver steering intervention is continuing, and adopts a final value among the offset values calculated from the driver steering intervention being continued until the driver steering intervention finishes and there is a return to the automatic steering state as an offset amount for the corrected target travel path in the automatic steering state.

12. The vehicle control method according to claim 9, wherein
the third step determines whether a state is an automatic driving state or the driver steering state based on a presence or absence of a steering wheel operation by the driver and the lateral position deviation from the target travel path at the forward point-of-gaze of the host vehicle.

13. The vehicle control method according to claim 9, comprising
a seventh step of detecting a steering torque value of the host vehicle, wherein
the third step includes:
a first procedure of comparing the steering torque value detected in the seventh and a preset first threshold;
a second procedure of, based on the steering torque value being equal to or less than the first threshold, comparing a value of the lateral position deviation with respect to the target travel path at the forward point-of-gaze of the host vehicle and a preset second threshold; and
a third procedure of, based on the value of the lateral position deviation being equal to or less than the second threshold, determining that there is no driver steering intervention.

14. The vehicle control method according to claim 9, wherein the fourth step calculates the offset amount using the following expression, $$yl0\_\text{offset}(t) = yl0(t) + el0(t) \times Ld(t) \qquad \text{Math. 9}$$

Herein, yl0_offset(t) is an offset amount,
yl0($t$) is a lateral position deviation between a host vehicle position and a target travel path,
el0($t$) is an angle deviation at a forward point-of-gaze, and
Ld(t) is a host vehicle forward point-of-gaze.

15. The vehicle control method according to claim 9, wherein the second step calculates the target travel path using the following expression, $$\text{Path\_map}(t) = dC(t) \times X^3 + 1/\{2 \times W\_\text{curv\_map}(t)\} \times X^2 + el0(t) \times X + yl0(t) \qquad \text{Math. 10}$$

Herein, Path_map(t) is a target travel path,
dC(t) is a path curvature change,
X is a travel direction distance,
W_curv_map(t) is a path curvature radius,
el0($t$) is an angle deviation at a forward point-of-gaze, and
yl0($t$) is a lateral position deviation between a host vehicle position and a target travel path.

16. The vehicle control method according to claim 9, wherein the fourth step calculates the corrected target travel path using the following expression, $$\text{Path\_collect}(t) = dC(t) \times X^3 + 1/[2 \times \{W\_\text{curv\_map}(t) + yl0\_\text{offset}(t)\}] \times X^2 + el0(t) \times X + \{yl0(t) - yl0\_\text{offset}(t)\} \qquad \text{Math. 11}$$

Herein, Path_collect(t) is a corrected target travel path,
dC(t) is a path curvature change,
X is a travel direction distance,
W_curv_map(t) is a path curvature radius,
yl0_offset(t) is an offset amount,
el0($t$) is an angle deviation at a forward point-of-gaze, and
yl0($t$) is a lateral position deviation between a host vehicle position and a target travel path.

17. The vehicle control device according to claim 2, wherein
the at least one processor is further configured to determine whether a state is an automatic driving state or the driver steering state based on a presence or absence of a steering wheel operation by the driver and the lateral position deviation from the target travel path at the forward point-of-gaze of the host vehicle.

18. The vehicle control device according to claim 2, comprising
a vehicle sensor that detects a steering torque value of the host vehicle, wherein
the at least one processor is further configured to:
compare the steering torque value detected by the vehicle sensor and a preset first threshold;
based on the steering torque value being equal to or less than the first threshold, compare a value of the lateral position deviation with respect to the target travel path at the forward point-of-gaze of the host vehicle and a preset second threshold; and
based on the value of the lateral position deviation being equal to or less than the second threshold, determine that there is no driver steering intervention.

19. The vehicle control method according to claim 10, wherein
the third step determines whether a state is an automatic driving state or the driver steering state based on a presence or absence of a steering wheel operation by the driver and the lateral position deviation from the target travel path at the forward point-of-gaze of the host vehicle.

20. The vehicle control method according to claim 10, comprising
a seventh step of detecting a steering torque value of the host vehicle, wherein
the third step includes:
a first procedure of comparing the steering torque value detected in the seventh step and a preset first threshold;
a second procedure of, based on the steering torque value being equal to or less than the first threshold, comparing a value of the lateral position deviation with respect to the target travel path at the forward point-of-gaze of the host vehicle and a preset second threshold; and
a third procedure of, based on the value of the lateral position deviation being equal to or less than the second threshold, determining that there is no driver steering intervention.

* * * * *